United States Patent Office 3,177,173
Patented Apr. 6, 1965

3,177,173
AQUEOUS LATEXES OF HEAT-CURABLE ELASTOMERS CONTAINING CARBOXYLIC ACID GROUPS
Harold E. Filter, Midland, and Robert J. Pueschner, St. Louis, Mich., assignors to The Dow Chemical Company, Midland, Mich., a corporation of Delaware
No Drawing. Filed May 31, 1961, Ser. No. 113,597
13 Claims. (Cl. 260—29.7)

This invention relates to improved latexes of heat-curable elastomeric interpolymers. More particularly, it relates to those improved aqueous latexes of elastomers containing an open-chain aliphatic conjugated diene, such as butadiene-1,3, polymerized in the molecule.

It has been known for some time that certain aqueous polymer latexes are particularly valuable vehicles for use in the preparation of continuous, coherent films and coatings. For such uses the latexes must meet numerous requirements, specifications, and considerations. For example, the latex must usually be film forming by evaporation of the water. It must be stable to applied stresses and to environmental exposure. These requirements and considerations, as well as many others, are well known to the skilled worker in the latex art.

One class of polymer latexes which has had an unusually wide acceptance in the film and coatings field is that of the copolymers of a monovinyl aromatic monomer, such as styrene, and an open-chain aliphatic conjugated diene, such as butadiene-1,3. Among many other applications those latexes have been tried as backings for fabrics, such as tufted carpeting. In that application, however, the prior elastomeric latexes, when unmodified, exhibited unacceptable wash resistance and also failed when the fabrics were exposed to dyebaths at elevated temperatures for prolonged periods. When the latexes were formulated with a small amount of sulfur, coatings deposited and subsequently thermally cured, the coatings showed a measurable improvement in wash and dyebath resistance. That technique, however, required the extra step of incorporating the additive. In addition, although certain of the properties of the coating were improved, it was found that the color and odor characteristics of the coating became poorer.

It is also known that sulfur-cured films can be prepared from latexes of those styrene/butadiene polymers. Those sulfur-cured films are subject generally to the same disadvantages mentioned above under coatings of these copolymers.

It is also known that coatings and films of polybutadien may be deposited from aqueous latex media. In general, those films and coatings have had chemical and physical properties that are unsatisfactory for commercial exploitation. Those polymeric materials may also be cured with sulfur and other similar vulcanizing agents. However, when so cured, the technique suffers from similar disadvantages to those mentioned above.

As a consequence, it would be desirable to have an aqueous latex of an inherently curable interpolymer which would form coatings that retained the elastomeric and other noteworthy properties of the styrene/butadiene type or polybutadiene latexes.

With the above viewpoints in mind, it is the principal object of this invention to provide an improved latex of an elastomeric interpolymer.

A further object is the provision of such an improved latex of an interpolymer containing essentially butadiene-1,3 or similar monomer in the polymeric structure.

Another object is the provision of such a latex which is film forming and of an interpolymer which is inherently curable without requiring incorporation of separate crosslinking, vulcanizing, or similar agents.

An additional object is the provision of a cured film of that inherently curable interpolymer.

It has now been found that the above objects are attained with an aqeous latex of an interpolymer composed of (I) from about 80 to 99 percent by weight of non-acidic monomeric materials comprising at least 16 percent by weight of an open-chain aliphatic conjugated diene having from 4 to about 9 carbon atoms with any remainder of said non-acidic monomeric material being of a monovinyl aromatic monomer and (II) from 20 to 1 percent by weight of a polymerizable carboxylic monomer mixture consisting essentially of (1) an α,β-unsaturated monocarboxylic acid and (2) an α,β-unsaturated dicarboxylic acid in the ratio of about 0.5 to 2 parts by weight dicarboxylic acid for each part of monocarboxylic acid.

As indicated, the interpolymers of the present invention are at least ternary polymers composed of a polymerizable open-chain aliphatic conjugated diene having from 4 to about 9 carbon atoms, an unsaturated monocarboxylic acid, an unsaturated dicarboxylic acid, and, optionally, a monovinyl aromatic monomer.

By the term, open-chain aliphatic conjugated diene having from 4 to about 9 carbon atoms, it is meant to include, typically, butadiene-1,3, 2-methyl-butadiene-1,3,2, 3-dimethyl-butadiene-1,3, piperylene, 2-neopentylbutadiene-1,3, and other hydrocarbon homologs of butadiene-1,3, and, in addition, the substituted dienes, such as 2-chlorobutadiene-1,3, 2-cyano-butadiene-1,3, the substituted straight chain conjugated pentadienes, the straight and branch chain hexadienes, and others having from 4 to about 9 carbon atoms. The butadiene-1,3 hydrocarbons and butadiene-1,3, specifically, because of their ability to produce particularly desirable polymeric materials, are preferred.

By the term, monovinyl aromatic monomer, it is intended to include those monomers wherein a vinyl group is attached directly to an aromatic nucleus containing from 6 to 10 carbon atoms. Those monomers are intended to include alkyl- or halo-substituted compounds. Typical of these monomers are para-methyl styrene, meta-ethyl styrene, ortho,para-dimethyl styrene, ortho,-para-diethyl styrene, para-chlorostyrene, isopropyl styrene, ortho-methyl-para-isopropyl styrene, and ortho-para-dichlorostyrene. The term is also intended to include comonomeric mixtures of styrene with α-methyl styrene or one of the above-named vinyl aromatic monomers. Because of their availability and their ability to produce desirable polymers and for other reasons, it is preferred to use styrene or vinyl toluene as the monovinyl aromatic monomer.

As indicated, the present invention comprehends the use of all ratios of the aforementioned non-carboxylic monomeric materials as long as the interpolymer contains at least about 16 percent by weight of the diene. Thus, these monomers should be in a ratio to each other of between 0 to about 80 percent of the monovinyl aromatic monomer and complementarily from 100 to 20 percent of the stated diene. Outside of these ratios the polymers generally do not exhibit the desired community of properties, such as the requisite film formability, for the preparation of films and coatings of the type contemplated herein.

To achieve the stated benefits and advantages of the invention, it is requisite that, in addition to the non-acidic monomer or comonomers, the interpolymer contain interpolymerized within the polymer molecule a combination of an unsaturated monocarboxylic acid and an unsaturated dicarboxylic acid. Typical of the unsaturated monocarboxylic acids, there may be mentioned acrylic acid, methacrylic acid, and crotonic acid. Exemplary of the dicarboxylic acids, there may be mentioned maleic acid, fumaric acid, itaconic acids, and others known to polymerization chemists. These acidic monomers must be present within certain ratios to one another to attain the desired results. It is necessary that the interpolymer contain from 0.5 to 2 parts by weight of the unsaturated dicarboxylic acid for each part of the unsaturated monocarboxylic acid if the stated objective of an inherently curable interpolymer is to result. Outside of these ratios of acidic monomers, the polymers are not inherently curable without the use of a polyvalent metal salt, sulfur, a polyfunctional (acid reacting) compound or similar agent to achieve the desired cure. In addition, it is found that the combined weight of the acidic monomers should be in the proportion from about 1 to about 20 percent of the total weight of the interpolymer. When there is less than one percent, there is generally insufficient carboxylic function present to achieve curability regardless of the ratio and the nature of the acidic monomers. When there is more than about 20 percent, the polymers become more water sensitive, are more difficult to prepare without precoagulum, the monomeric mixture is noticeably corrosive to the polymerization equipment, and, in general, the polymers are undesirable.

The present invention falls in the area of emulsion polymerization. As is known in this field, the preparation of a polymer latex involves many variables which to large extent are interdependent. The invention contemplates the use of the prior known emulsion polymerization technology, including known procedures, techniques, and compositions. Exemplary of such prior technology, it is known that polymer latexes may be prepared by continuous or batchwise emulsion polymerization techniques. In typical batchwise polymerization the monomeric materials are dispersed in an aqueous phase containing a free radical polymerization cataylst and an emulsifying agent for the monomers in water. The aqueous phase may also include buffers, accelerators, chelating agents, and similar ingredients known in the art to produce a particular result. In the typical batchwise procedure the polymerization is initiated and maintained under agitation at an elevated temperature until polymerization is substantially complete. After polymerization is completed, it is a common practice to incorporate certain additives, such as additional wetting agents, thickening agents, fillers, dyes pigments, and the like, which perform specified functions. Also, following polymerization it is frequently desired to demonomerize the latex by known methods, such as by exposure of the latex to slightly elevated temperatures while under reduced pressure, by steam distillation, or by other known technique.

Useful continuous polymerization systems may include, in effect, a modified batchwise procedure in which the monomers are added continuously or in increments to the polymerizing mass as polymerization proceeds, or the monomers plus one or more of the other ingredients, such as emulsifier, protective colloid, or catalyst, are so added. Such procedures have found wide utility in copolymerizations where the monomers react with each other (co-polymerization) at a different rate from what they react with themselves (homopolymerization). Such modified techniques have, with some monomeric compositions, been credited with providing a more uniform polymer composition, in achieving more satisfactory and more controllable polymerization rates, and in providing other benefits over the aforementioned batchwise procedure. Continuous polymerization also includes true continuous procedures involving either a series of interconnected zones, such as polymerization kettles or continuous coils or the like. The present invention finds utility and operability in all of these known procedures and techniques.

It is also within the general comprehension of the invention to employ polymerization techniques commonly referred to as seed polymerization. In this technique a small amount of a polymerized latex is incorporated into the polymerization recipe. This seed latex, which usually will constitute from about 1 to about 5 percent of the weight of the monomers to be polymerized, does not necessarily have to be of identical compositon to the monomeric material being polymerized. Thus, latexes of styrene/butadiene copolymers of one ratio may be used as the seed latex for styrene/butadiene/carboxylic acid copolymers of a different styrene/butadiene ratio than the seed latex. The concept of speed polymerization will be known to the skilled worker.

It is generally accepted in emulsion polymerization technology that agitation is required to form the dispersion initially and to maintain the dispersion throughout polymerization. The rate of agitation to be used in any particular instance will be dependent primarily on the overall design of the polymerization equipment. The minimum amount of agitation required to form and to maintain the dispersion is usually to be desired.

The catalysts that are commonly and traditionally employed in emulsion polymerization are the water-soluble per-compounds, mixtures of water-soluble and monomer-soluble per-compounds, and other compounds of similar decomposition mechanism. Typical of the useful water-soluble catalysts are hydrogen peroxide, potassium persulfate, and the like. Small amounts of monomer-soluble materials, such as the organic peroxides, including benzoyl peroxide and lauroyl peroxide, have also been used in conjunction with the water-soluble catalyst. It has been found that for use in this invention a combination of from about 0.1 to 1 percent of the weight of the monomers of potassium persulfate in combination with from 0 to 1 percent of benzoyl peroxide results in a unusually effective catalytic system, and this combination is accordingly preferred for use herein. If desired, however, the other known catalysts, including the complex catalysts, such as the so-called redox systems consisting of a combination of oxidizing agent and reducing agent, may also be used.

In preparing the interpolymers of this invention, the above-described monomeric mixtures are interpolymerized in an acidic aqueous medium in the presence of the defined polymerization catalyst. The use of an acidic medium generally insures the production of a true addition type interpolymer containing interpolymerized free carboxylic acid groups and having sufficiently high molecular weight to exhibit desirable properties. The aqueous medium may either be emulsifier free or it may contain an emulsifier adapted for use under acidic conditions. The emulsifier, when used, is preferably selected from the anionic class of such materials. This class of materials is well known and includes, typically, the alkyl aryl sulfonates, the alkali metal alkyl sulfates, the fatty acid soaps, and others. Representative of those useful emulsifiers is an alkyl sodium sulfate, such as lauryl sodium sulfate, and a diester of sulfosuccinic acid, such as the dihexyl ester of sodium sulfosuccinic acid. Other species of useful anionic emulsifying agents will be known. In addition to the above ionic or polar emulsifiers stable in acidic media, still other materials which may be used singly or in combination with one or more of the above-mentioned types of emulsifiers include the so-called nonionic emulsifiers, such as the polyether alcohols prepared by condensing ethylene oxide with higher alcohols. A typical example of a useful nonionic, surface-active agent that may be used herein is an isooctyl phenyl polyethoxy ethanol. Other useful nonionic wetting agents will be known. The use of such nonionic agents during or added after polymerization may contribute to the stability of the latex to polyvalent metal ions.

The emulsifier is commonly employed in an amount of from about 1 to 5 percent by weight based on the weight of the monomer. When there is less than one percent used, the stability of the latex, its utility as a coating material, and other properties of the latex suffer adversely. When there is more than about 5 percent employed, there is usually no proportional increase in benefits and the resulting latex may have such a propensity to foam as to detract from its utility as a coating composition. The optimum amount of emulsifier may be easily determined by simple preliminary experiments.

As is known in the styrene/butadiene polymerization art, it is frequently desirable to the attainment of latexes having the most valuable properties that a chain transfer agent should be employed in the polymerization recipe. Typical of such chain transfer agents are lauryl mercaptan, t-dodecyl mercaptan, carbon tetrachloride, and diisopropyl dixanthogen. Other useful chain transfer agents will be known. It is also possible to employ combinations and mixtures of such chain transfer agents. The concentration of chain transfer agent required will vary with the efficiency of the specific agent used and usually with the amount of conjugated diene present. The optimum amount to be employed in any case is the minimum necessary to attain a latex product of the desired properties. These optimum concentrations are readily determined by simple preliminary experiment.

In the preparation of the present latexes, it has been found that the polymerization temperature should be in the range of from about 30° C. to about 80° C. and preferably from about 60° to about 80° C. Higher temperatures than about 80° C. present difficulties in the polymerization due to the increased pressure of volatile ingredients, such as butadiene.

For coatings compositions it is desirable to have latexes having polymer solids within the range of from about 20 to 55 percent by weight. When there is significantly less than about 20 percent solids, it is difficult to attain continuous, coherent films by simple deposition and drying. Furthermore, latexes having appreciably less than about 20 percent solids are uneconomical to prepare. Latexes containing appreciably more than 55 percent solids are difficult to prepare and when made are likely to be unduly sensitive to mechanical shearing forces. However, the present invention is not limited to any given amount of solids content.

The latexes of the present invention are uniform, white compositions that form clear, continuous films at room temperature by air drying, which films are heat curable at from about 200° to 300° F. to exhibit optimum tensile strength in about 5 to about 30 minutes curing time. It will be appreciated that the time and temperature required to cure the films are in inverse relationship so that high temperatures will require shorter times than low temperatures. Time and temperature schedules for curing outside of the expressed ranges will be operable in many instances.

In addition, the latexes exhibit excellent mechanical stability and little evidence of foaming. Because of the presence of the carboxylic groups, the interpolymers show significantly improved pigment binding capacity over the prior known styrene/butadiene latexes.

The latexes of this invention may be formulated with the conventional and common additives, such as pigments, dyes, fillers, stabilizers, preservatives, and the like, which are commonly added in paints, adhesives, and similar compositions. In addition, the latexes may be blended with other known latexes if desired.

The advantages and benefits of the improved latexes of this invention will be more apparent from the following illustrative example wherein all parts and percentages are by weight.

*Example 1*

A monomeric mixture composed of 35 parts styrene, 35 parts butadiene, 2 parts fumaric acid, and 1.2 parts of acrylic acid was dispersed in 100 parts of water containing 1.5 parts of dihexyl ester of sodium sulfosuccinic acid, 0.7 part potassium persulfate, 0.7 part of sodium bicarbonate.

The polymerization was conducted at 70° C. for 12 hours, after which a potassium salt of dithio carbamic acid was added as a chain terminating agent. The latex was then steam distilled. The percent solids of the latexes was 44.8 percent. Residual monomer was less than 0.1 percent. 200 cubic centimeters of the latex was subjected to high speed agitation for 30 minutes with no coagulation. Under the same test there was 600 milliliters or less foam build-up.

The latex was thickened by incorporating 15 percent solids of an ammonium hydroxide-cut casein to 44.8 percent of the latex solids. The formulation was de-aired on a centrifuge for about 30 seconds. Films were cast on polyethylene covered glass plates to a wet thickness of 0.02 inch. The films were air dried overnight at room temperature. After drying, the films were removed and cured in a circulating air oven at 250° F. for 20 minutes. Two films were left uncured as a control. The uncured films (controls) exhibited a tensile strength of about 600 pounds per square inch and an elongation of about 775 percent. After curing for 20 minutes, the tensile strength of the films was about 2300 pounds per square inch and the elongation about 750 percent.

By way of comparison, latexes were prepared from monomeric mixtures employing only fumaric acid in one case and only acrylic acid in another case. In each instance the percentage of styrene, butadiene, and carboxylic acid was the same. Films were cast from these films and tested as above. It was found that the acrylic acid-containing film had a tensile strength before curing of about 1800 pounds per square inch and after curing for 20 minutes of 1600 pounds per square inch. That film had an elongation prior to curing of 850 percent and after curing of about 900 percent. The fumaric acid-containing latex formed films having a tensile strength before curing of about 300 pounds per square inch and after curing of about 1450 pounds per square inch with an elongation before curing of about 600 percent and after curing about 700 percent. These runs demonstrate the need for the combination of the monocarboxylic acid and the dicarboxylic acid in the interpolymer if an inherently curable film is to result.

Coatings and films of similar properties are derived from heat-curable interpolymers when the above latex containing fumaric and acrylic acids is prepared replacing the fumaric acid by the identical amount of maleic acid and also when the acrylic acid is replaced by methacrylic acid and also with crotonic acid.

The interpolymers of this invention provide new and unique compositions when thermally cured as evidenced by their high strength and low solubility. Because of their ability to be cured or converted to strong compositions without reinforcing agents, the interpolymers of this invention are specially well adapted for production of films and coatings.

What is claimed is:

1. A heat-curable, film-forming composition of matter comprising an aqueous latex of an interpolymer composed essentially of (I) from about 80 to about 99 percent by weight of a non-acidic monomeric material comprising at least 16 percent by weight of an open-chain aliphatic conjugated diene having from 4 to about 9 carbon atoms with any remainder of said non-acidic monomeric material being of a monovinyl aromatic monomer and (II) from 20 to 1 percent by weight of a polymerizable carboxylic monomer mixture consisting essentially of (1) an α,β-unsaturated monocarboxylic acid and (2) an α,β-unsaturated dicarboxylic acid, said carboxylic acids being in the ratio to each other of from 0.5 to 2 parts by weight of said dicarboxylic acid for each part of said monocarboxylic acid.

2. A heat-curable, film-forming composition of matter comprising an aqueous latex of an interpolymer composed of (I) from about 80 to 99 percent by weight of a non-acidic monomeric material consisting of from about 40 to about 60 percent by weight of an open-chain aliphatic conjugated diene having from 4 to about 9 carbon atoms and from 60 to 40 percent by weight of a monovinyl aromatic monomer and (II) from 20 to 1 percent by weight of a polymerizable carboxylic monomer mixture consisting essentially of an $\alpha,\beta$-unsaturated monocarboxylic acid and an $\alpha,\beta$-unsaturated dicarboxylic acid, said carboxylic acids being in the ratio to each other of from 0.5 to 2 parts by weight of said dicarboxylic acid for each part of said monocarboxylic acid.

3. The composition claimed in claim 2 wherein said monovinyl aromatic monomer is styrene.

4. The composition claimed in claim 2 wherein said conjugated diene is butadiene-1,3.

5. The composition claimed in claim 2 wherein said unsaturated monocarboxylic acid is acrylic acid.

6. The composition claimed in claim 2 wherein said unsaturated dicarboxylic acid is fumaric acid.

7. The composition claimed in claim 2 wherein said latex contains from about 20 to about 55 percent by weight of polymer solids.

8. A thermally cured film of an interpolymer composed of (I) from about 80 to about 99 percent by weight of a non-acidic monomeric material comprising at least 16 percent by weight of an open-chain aliphatic conjugated diene having from 4 to about 9 carbon atoms with any remainder of said non-acidic monomeric material being of a monovinyl aromatic monomer and (II) from 20 to 1 percent by weight of a polymerizable carboxylic monomer mixture consisting essentially of (1) an $\alpha,\beta$-unsaturated monocarboxylic acid and (2) an $\alpha,\beta$-unsaturated dicarboxylic acid, said carboxylic acids being in the ratio to each other of from 0.5 to 2 parts by weight of said dicarboxylic acid for each part of said monocarboxylic acid.

9. A thermally cured film of an interpolymer composed of (I) from about 80 to 99 percent by weight of a non-acidic monomeric material consisting of from about 40 to about 60 percent by weight of an open-chain aliphatic conjugated diene having from 4 to about 9 carbon atoms and from 60 to 40 percent by weight of a monovinyl aromatic monomer and (II) from 20 to 1 percent by weight of a polymerizable carboxylic monomer mixture consisting essentially of (1) an $\alpha,\beta$-unsaturated monocarboxylic acid and (2) an $\alpha,\beta$-unsaturated dicarboxylic acid, said carboxylic acids being in the ratio to each other of from 0.5 to 2 parts by weight of said dicarboxylic acid for each part of said monocarboxylic acid.

10. The composition claimed in claim 9 wherein said monovinyl aromatic monomer is styrene.

11. The composition claimed in claim 9 wherein said conjugated diene is butadiene-1,3.

12. The composition claimed in claim 9 wherein said unsaturated monocarboxylic acid is acrylic acid.

13. The composition claimed in claim 9 wherein said unsaturated dicarboxylic acid is fumaric acid.

References Cited by the Examiner
UNITED STATES PATENTS

| | | | |
|---|---|---|---|
| 2,724,707 | 11/55 | Brown | 260—29.7 |
| 2,868,754 | 1/59 | Eilbeck et al. | 260—29.7 |
| 2,947,733 | 8/60 | Werner et al. | 260—78.5 |
| 2,959,821 | 11/60 | Kolb | 260—29.7 |

WILLIAM H. SHORT, *Primary Examiner.*

D. ARNOLD, LEON J. BERCOVITZ, *Examiners.*